(12) United States Patent
Barton et al.

(10) Patent No.: US 8,764,858 B2
(45) Date of Patent: Jul. 1, 2014

(54) HYDROGEN GAS GENERATING APPARATUS WITH EXPANDABLE REACTION CHAMBER

(75) Inventors: Russell Barton, New Westminster (CA); Guanghong Zheng, Westlake, OH (US)

(73) Assignee: Intelligent Energy Inc., San Jose, CA (US)

( * ) Notice: Subject to any disclaimer, the term of this patent is extended or adjusted under 35 U.S.C. 154(b) by 235 days.

(21) Appl. No.: 13/021,798

(22) Filed: Feb. 7, 2011

(65) Prior Publication Data

US 2011/0194992 A1 Aug. 11, 2011

Related U.S. Application Data

(60) Provisional application No. 61/302,339, filed on Feb. 8, 2010.

(51) Int. Cl.
*B01J 7/02* (2006.01)

(52) U.S. Cl.
USPC ............... 48/61; 422/239; 422/129; 422/242

(58) Field of Classification Search
CPC ............. C01B 3/065; C01B 2203/066; C01B 2203/04; C01B 2203/0405; C01B 2203/06; C01B 3/0031; C01B 3/0036; C01B 3/0042; C01B 3/0047; C01B 3/06; C01B 3/32; Y02E 60/362; Y02E 60/50; Y02E 60/324; Y02E 60/327; Y02E 60/364; Y02E 60/321; Y02E 60/366; H01M 8/04208; H01M 8/04216; H01M 8/065; H01M 8/04201; H01M 8/04089; H01M 8/0687; H01M 8/1002; B01J 7/02; B01J 19/1893; B01J 2208/00539; B01J 2219/00162; B01J 2219/00182; B01J 2219/00186; B01J 23/40; B01J 4/02
USPC .................................................. 429/129–242
See application file for complete search history.

(56) References Cited

U.S. PATENT DOCUMENTS 6,756,148 B2 6/2004 Hojo et al.
6,808,833 B2 10/2004 Johnson
(Continued)

FOREIGN PATENT DOCUMENTS

WO 2006135896 A2 12/2006
WO 2010035250 A1 4/2010

OTHER PUBLICATIONS

Patent Cooperation Treaty (PCT), International Search Report and Written Opinion for Application No. PCT/US2011/023285, filed Feb. 1, 2011, mailed May 3, 2011, European Patent Office, Netherlands.

*Primary Examiner* — Imran Akram
(74) *Attorney, Agent, or Firm* — Baker Hostetler LLP

(57) ABSTRACT

A hydrogen gas generating apparatus for providing hydrogen gas to a fuel cell stack is provided. The apparatus includes an expandable reaction chamber containing a solid reactant component and a collapsible receptacle containing a liquid reactant component with a housing. The reaction chamber includes an expandable reactant zone defined by a moveable partition that retains the reactants and reaction products within the reaction chamber. The apparatus also includes a liquid transport control system and a fluid path for transporting the liquid reactant component from the collapsible receptacle to the reactant zone in the reaction chamber, where the liquid and solid reactant components react to generate hydrogen gas. The receptacle collapses with a corresponding expansion of the reaction chamber as liquid reactant component is used, and the reactant zone expands within the reaction chamber in response to pressure from the increasing volume of reaction products on the moveable partition. Volume exchange among the expandable reaction chamber, the expandable reactant zone and the collapsible receptacle provides a high volume of hydrogen gas from a hydrogen generating apparatus of limited volume.

11 Claims, 5 Drawing Sheets

(56) References Cited

U.S. PATENT DOCUMENTS

| | | |
|---|---|---|
| 6,924,054 B2 | 8/2005 | Prasad et al. |
| 6,932,847 B2 | 8/2005 | Amendola et al. |
| 7,097,813 B2 | 8/2006 | Ord et al. |
| 7,105,033 B2 | 9/2006 | Strizki et al. |
| 7,172,825 B2 | 2/2007 | Adams et al. |
| 7,198,761 B2 | 4/2007 | Buelow et al. |
| 7,316,719 B2 | 1/2008 | Devos et al. |
| 7,323,148 B2 | 1/2008 | Shah et al. |
| 7,481,858 B2 | 1/2009 | Rosenzweig et al. |
| 7,540,892 B2 | 6/2009 | Strizki et al. |
| 7,544,431 B2 | 6/2009 | deVos et al. |
| 7,655,056 B2 | 2/2010 | Devos |
| 2005/0074643 A1 | 4/2005 | Adams et al. |
| 2005/0158595 A1* | 7/2005 | Marsh et al. ............ 429/19 |
| 2005/0238573 A1 | 10/2005 | Zhang et al. |
| 2006/0174952 A1* | 8/2006 | Curello et al. ......... 137/614.03 |
| 2006/0191198 A1 | 8/2006 | Rosenzweig et al. |
| 2006/0191199 A1 | 8/2006 | Rosenzweig |
| 2006/0222911 A1 | 10/2006 | Ord et al. |
| 2006/0269470 A1 | 11/2006 | Zhang et al. |
| 2007/0271844 A1 | 11/2007 | Mohring et al. |
| 2008/0026266 A1 | 1/2008 | Kobayashi |
| 2008/0216906 A1 | 9/2008 | Curello et al. |
| 2009/0017347 A1 | 1/2009 | Damery et al. |
| 2009/0060833 A1* | 3/2009 | Curello et al. ......... 423/658.2 |
| 2009/0101520 A1 | 4/2009 | Zhang et al. |
| 2009/0104481 A1 | 4/2009 | Mohring et al. |
| 2010/0247426 A1* | 9/2010 | Wallace et al. ......... 423/648.1 |
| 2011/0176973 A1* | 7/2011 | Rosenzweig et al. ...... 422/242 |

\* cited by examiner

HYDROGEN GAS GENERATING APPARATUS WITH EXPANDABLE REACTION CHAMBER

CROSS-REFERENCE TO RELATED APPLICATIONS

This application claims the benefit of U.S. Provisional Application No. 61/302,339, filed Feb. 8, 2010.

TECHNICAL FIELD

This invention relates to a fuel supply for a fuel cell, and more particularly, to a hydrogen generating fuel cell cartridge.

BACKGROUND

In a hydrogen fuel cell, hydrogen is delivered to the anode, and oxygen is delivered to the cathode. At the anode, the hydrogen is oxidized to $H^+$ ions, which travel to the cathode. Electrons from the oxidation reaction travel through an external circuit to the cathode power to a device connected to the fuel cell. At the cathode, the electrons reduce the oxygen, which then reacts with the hydrogen ions to form water molecules.

At the anode:

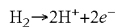

At the cathode:

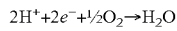

Because hydrogen fuel cells produce water as a waste product, the use of these fuel cells results in fewer environmental concerns than batteries, which typically contain heavy metals and acids or strong bases. In addition, fuel cells consume fuels that are provided to the fuel cell only as needed. Thus, the life of a fuel cell is, at least in theory, unlimited since the fuel cell only requires fuel from an external source that can be replenished periodically.

One type of fuel cell is a proton exchange membrane (PEM) fuel cell, which operates at lower temperature and pressure ranges than some other types of fuel cells. In a PEM fuel cell, the hydrogen is catalytically split into protons and electrons at the anode side of the membrane electrode assembly. The newly formed protons permeate through the membrane to the cathode side. The electrons travel along an external load circuit to the cathode side of the membrane electrode assembly to create the current output of the fuel cell. The oxygen delivered to the cathode side of the membrane electrode assembly reacts with the protons permeating through the polymer electrode membrane and the electrons arriving through the external circuit to form water. PEM fuel cells are useful for applications wherein cleanliness, quiet, and compactness are desirable, such as for portable electronic devices.

SUMMARY

In one aspect of the invention, there is provided a hydrogen gas generating apparatus that includes a housing having a fixed interior volume; an expandable reaction chamber within the housing and which includes a moveable partition defining an expandable reactant zone and contains a solid reactant component within the reactant zone; and a collapsible receptacle within the housing which contains a liquid reactant component. The hydrogen generating apparatus also includes a fluid path for transporting the liquid reactant component from the collapsible receptacle to the reactant zone of the reaction chamber, and a liquid reactant component transport control system. The liquid reactant component reacts with the solid reactant component within the reaction chamber to generate hydrogen gas.

In one embodiment, the fluid path includes a plurality of tubular members attached to the collapsible receptacle, each member having a free end extending into the reactant zone of the reaction chamber.

In one embodiment, the free ends of the tubular members are moveable with the collapsible receptacle to transport liquid reactant component to unreacted solid reactant component within the reactant zone. The free ends of the tubular members may be initially disposed in a distal portion of the reactant zone relative to the moveable partition and moveable toward a proximal portion of the reactant zone relative to the moveable partition.

In one embodiment, the liquid reactant control system controls the transport of the liquid reactant component, includes a valve, and may further include a pressure regulator attached to the valve. The pressure regulator may be positioned within the collapsible receptacle.

In one embodiment, the moveable partition includes a porous material.

In one embodiment, the solid reactant component includes a chemical hydride and the liquid reactant component includes water. The chemical hydride may include sodium borohydride. The liquid reactant component may further include functional additives.

In another embodiment, the solid reactant component includes sodium silicide and the liquid reactant component includes water.

In one embodiment, the moveable partition is a slidable partition that slides within the reaction chamber.

DETAILED DESCRIPTION

Figure 1:
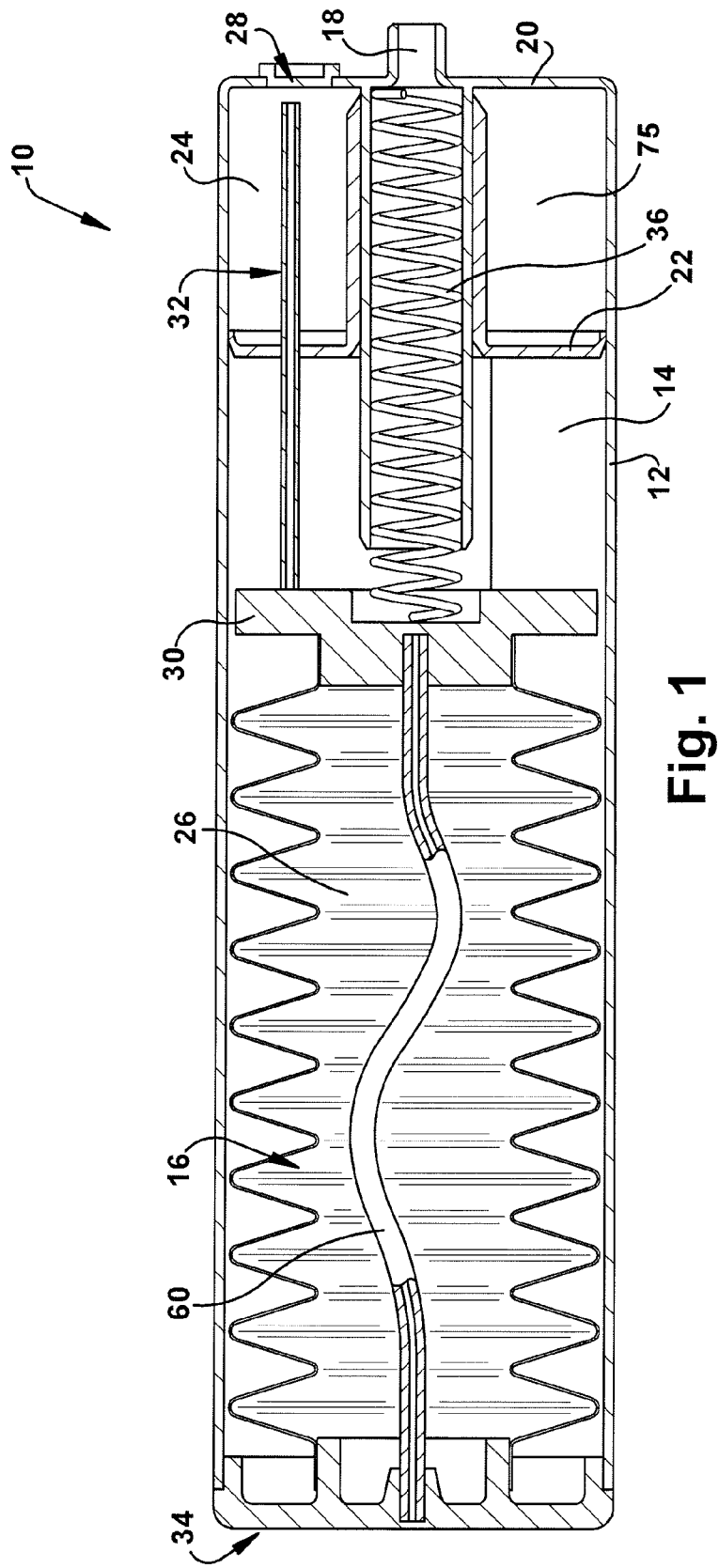
FIG. 1 is a sectional schematic view of an embodiment of a hydrogen generating apparatus according to the present invention.

As illustrated in the drawings and described in detail below, the present invention is directed to a fuel supply configured to be removably coupled to a fuel cell. The term "fuel supply", as used herein, includes, but is not limited to, disposable cartridges, refillable cartridges, reusable cartridges, containers, cartridges that reside inside an electronic device powered by a fuel cell, removable cartridges, cartridges that are inside or outside of the electronic device or fuel cell, fuel tanks, fuel refilling tanks, other containers that store fuel and the tubes connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The present invention has a simple design and a high volume efficiency. It can provide a high hydrogen generating capacity through volume exchange among components whose volumes change as the fuel supply is used such that space that becomes available when a component becomes smaller is occupied by a component that becomes larger. For example, as reactants are consumed and decrease in volume, space is created into which the reaction products expand.

The hydrogen fuel cell described herein may be any type of hydrogen fuel cell stack known in the art and be selected from, for example, proton exchange membrane (PEM) fuel cells, phosphoric acid fuel cells, alkaline fuel cells, solid oxide fuel cells and molten carbonate fuel cells.

The fuel supply can be a hydrogen gas generating apparatus that produces hydrogen gas, which is consumed by the fuel cell to produce electricity for an electronic device. The fuel supply may contain fuels such as chemical hydrides, alkali metal silicides, silica gel compositions containing alkali metals, and other chemicals that can be used to generate hydrogen.

The fuel supply can be of a suitable size to provide a desired quantity of hydrogen to the fuel cell stack before being replaced or refilled. The shape can be one that is compatible with and/or can be accommodated with, on or within a fuel cell-stack or a device using the fuel cell stack. For example, the fuel supply can be cylindrical, or it can be prismatic with a round, oval, rectangular, square or other cross-sectional shape.

The hydrogen generating apparatus of the present invention may include a reaction chamber containing a first reactant and a reservoir containing a second reactant. The first reactant can be in solid or gelled form as part of a solid reactant component. The second reactant is in liquid form as part of a liquid reactant component. The hydrogen generating apparatus additionally includes a device or system for controlling the transport of the second reactant from the reservoir to the reaction chamber. In an embodiment, the operating conditions inside the reaction chamber and/or the reservoir, such as a pressure and temperature inside the reaction chamber and the hydrogen flow rate, can be used in controlling the transport of the second reactant in the reservoir to the reaction chamber. For example, the second reactant in the reservoir can be introduced into the reaction chamber when the pressure inside the reaction chamber is less than a predetermined value, preferably less than the pressure in the reservoir, and, more preferably, less than the pressure in the reservoir by a predetermined amount. It is preferable that the flow of the second reactant from the reservoir into the reaction chamber is self-regulated. Thus, when the reaction chamber reaches a predetermined pressure, preferably a predetermined pressure above the pressure in the reservoir, the flow of the second reactant from the reservoir into the reaction chamber can be stopped to stop the production of hydrogen gas. Similarly, when the pressure of the reaction chamber is reduced below the pressure of the reservoir, preferably below the pressure in the reservoir by a predetermined amount, the second reactant can flow from the reservoir into the reaction chamber.

The reaction chamber is in a volume exchanging relationship with the reservoir such that, as liquid reactant component is transported from the reservoir and the reservoir becomes smaller, the reaction chamber is able to expand into the area previously occupied by the reservoir. For example, the reaction chamber can be immediately adjacent to the reservoir, or the reaction chamber can be separated from the reservoir by one or more other components of the apparatus, such as a valve assembly, that can be displaced as the reservoir becomes smaller.

The reaction chamber includes a moveable partition defining a reactant zone that initially contains the solid reactant component. The partition separates the reactant zone from the remainder of the reaction chamber. The partition can move by sliding, pivoting or deforming, for example. As liquid reactant component enters the reactant zone and reacts with the solid reactant component, hydrogen gas and other reaction products are produced. The hydrogen gas generated within the reactant zone passes through the partition enroute to an outlet to a fuel cell being supplied with hydrogen, while solid and liquid reaction products and unreacted solid reactant component and liquid reactant component are retained within the reactant zone by the partition. Because the combined volume of the solid and liquid reaction products and the unreacted solid and liquid reactant components is greater than the initial volume of the solid reactant component, the partition moves to expand the reactant zone. Because the volume that becomes available as the reservoir becomes smaller may be less than the increased volume of the reactant zone, additional space is needed within the apparatus. This additional space comes from the remainder of the reaction chamber, on the other side of the partition from the reactant zone. The initial volume of the reaction chamber and the reactant zone can be varied based on the compositions of the reactants and the relative volumes of the reactant components and the reaction products.

The moveable partition is made of a material through which the solid and liquid reactant components and the solid and liquid reaction products will not pass, but it also includes means for at least the hydrogen gas to pass therethrough. The partition can be made from a hydrogen permeable material, such as a microporous plastic material, or it can include one or more passageways blocked by a hydrogen permeable material, such a membrane or plug. Examples of suitable hydrogen permeable materials include microporous polymer materials such as polytetrafluoroethylene (PTFE) or expanded PTFE (ePTFE), a rubber such as silicone rubber, or other porous materials such as a ceramic filter material, a metal foam or a glass filter material. The surface of the partition can be coated or the pores of the material can be at least partially filled with other materials to provide the desired permeability with regard to hydrogen and other gases as well as liquids in the reactant zone. While it is preferable that the partition retains all solid and liquid reactant components and reaction products within the reactant zone, this is not essential if other means of separating those solids and liquids from the hydrogen gas provided to the fuel cell. For example, additional filters and/or hydrogen permeable and liquid and gas impermeable components can be contained within the portion of the reaction chamber outside the reactant zone and/or along the hydrogen path between the reaction chamber and the outlet to the fuel cell. Other materials or components for removing at least some other gases, such as water vapor, from the hydrogen gas can also be included in the reaction chamber outside the reactant zone or in the hydrogen path to the outlet.

The reservoir can include a deformable container that contains the liquid reactant component. The container can be of any suitable design and can be made from any suitable material. For example, the container can be a flexible or elastic bag or bellows that can collapse as the liquid reactant component is removed. The container can apply a force to assist in transporting the liquid to the reaction chamber, and/or other means of applying a force on the container (such as a spring or gas pressure) can be provided.

Preferably, liquid reactant component is transported to a portion of the reactant zone that contains or is close to unreacted solid reactant component as the hydrogen generating apparatus is being used. For example, a fluid path can be provided with an outlet that moves from one portion of the reactant zone toward another. In one embodiment the fluid path is coupled to the moveable partition, and in another embodiment the fluid path is coupled to an intermediate component between the reservoir and the reaction chamber, so that when the partition or the intermediate component moves, the fluid path outlet moves within the reactant zone, preferably from a distal portion toward a proximal portion of the reactant zone relative to the moveable partition.

In one embodiment, the material used as the first reactant in the hydrogen generating apparatus includes a chemical hydride. As used herein, the term "chemical hydride" is broadly intended to be any hydride capable of reacting with a liquid to produce hydrogen. Examples of chemical hydrides that are suitable for use in the hydrogen generating apparatus described herein include, but are not limited to, hydrides of elements of Groups IA-IVA of the Periodic Table and mixtures thereof, such as alkaline or alkali metal hydrides, or mixtures thereof. Specific examples of chemical hydrides include lithium hydride, lithium aluminum hydride, lithium borohydride, sodium hydride, sodium borohydride, potassium hydride, potassium borohydride, magnesium hydride, calcium hydride, and salts and/or derivatives thereof. The preferred form of the chemical hydride is a solid form (e.g., particulate, powder, granular, pellet tablet or cake).

The second liquid reactant reacts with the first reactant, optionally in the presence of a catalyst, to generate hydrogen. Preferably, suitable liquid reactants include, but are not limited to, water, alcohols, and/or dilute acids. The most common liquid reactants include water.

Sodium borohydride may be used as a hydrogen source for a hydrogen fuel cell. Hydrogen is produced by reacting the sodium borohydride with water, optionally in the presence of a catalyst and/or heat, as represented by the following:

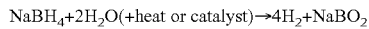

$$NaBH_4 + 2H_2O (+\text{heat or catalyst}) \rightarrow 4H_2 + NaBO_2$$

In one embodiment, the hydrogen source includes the solid form of $NaBH_4$. In solid form, $NaBH_4$ does not hydrolyze in the absence of water and therefore using solid $NaBH_4$ improves the shelf life of the cartridge. However, the aqueous form of hydrogen-bearing material, such as aqueous $NaBH_4$, can also be utilized.

The liquid and/or solid reactant may include a catalyst that can initiate and/or accelerate the production of hydrogen gas by increasing the rate at which the liquid reactant reacts with the solid fuel component. The catalyst can have any shape or size, and can be in any state. For example, the catalyst can be small enough to form a powder, or it can be as large as the reaction chamber. In some exemplary embodiments, the catalyst forms a catalyst bed. The catalyst can be located inside the reaction chamber or proximate to the reaction chamber, as long as at least one of either the first or second reactant comes into contact with the catalyst.

The catalyst of the present invention may include one or more transitional metals from Group VIII of the Periodic Table of Elements. For example, the catalyst may include transitional metals such as iron, cobalt, nickel, ruthenium, rhodium, platinum, palladium, osmium and iridium. Additionally, transitional metals in Group IB, i.e., copper, silver and gold, and in Group IIB, i.e., zinc, cadmium and mercury, may also be used in the catalyst of the present invention. The catalyst may also include other transitional metals including, but not limited to, scandium, titanium, vanadium, chromium and manganese.

The liquid and/or solid reactant may also include optional additives that reduce or increase the pH of the solution. The pH of the reactant can be used to determine the speed at which hydrogen is produced. For example, additives that reduce the pH of the reactant result in a higher rate of hydrogen generation. Such additives include, but are not limited to, acids, such as hydrochloric acid, nitric acid, acetic acid, sulfuric acid, citric acid, carbonic acid, malic acid, phosphoric acid and oxalic acid, among others. Conversely, additives that raise the pH, i.e., basic compounds, can lower the reaction rate to the point where almost no hydrogen evolves. The solution of the present invention can have any pH value less than 7, such as a pH of from about 0.01 to about 6 and, preferably, from about 0.1 to about 3.0.

In one embodiment, the solid reactant component includes dry sodium borohydride, optionally dry mixed with a solid catalyst and formed into a tablet, and the liquid reactant is an aqueous acid solution. Preferably, the solution can contain greater than about 5 weight percent, more preferably at least 10 weight percent of an acid such as acetic acid to provide a high yield of hydrogen. Higher concentrations of acid, up to at least 50 weight percent, can be used. For example, with a 20 weight percent acetic acid solution, the molar ratio of $H_2O$ to $NaBH_4$ is preferably greater than about 5:1, more preferably greater than about 6:1, and preferably at least about 7:1 for good hydrogen yields. Higher ratios can be used, and with a ratio of about 16:1, the reaction waste products would be expected to be soluble at room temperature, but as the ratio increases above 7:1, the more water that is used, and the lower the volume efficiency of the hydrogen generating apparatus. Additionally or alternatively, solid acids can be added in the solid mix of sodium borohydride.

An optional additive may be included in the liquid reactant component, in the solid reactant component and/or in the reaction chamber to substantially prevent the freezing of or reducing the freezing point of the liquid fuel component and/or liquid reaction products. In one embodiment the additive can be an alcohol-based composition, such as an anti-freezing agent. Examples of suitable anti-freeze agents include, but are not limited to, methanol, ethanol, n-propanol (such as 1-propanol or 2-propanol) and polyethylene glycol based compounds.

Other additives such as surfactants or wetting agents could be used to control the liquid surface tension and the reaction product viscosity to facilitate hydrogen flow in the porous systems and to control the reaction product foaming, particularly for the cartridges having a small diameter and containing solid reactant powders with micro inter-particles and intra-particle pores. Non-limiting examples of suitable surfactants and wetting agents include the Triton™ series of surfactants available from Dow Chemical, the Fluorad™ fluorochemical surfactants available from 3M, the low foaming fluorosurfactants available from Chemguard, Rhodafac® from Rhodia Chimie, and various additives (wetting and dispersing agents, surface additives, deformers, rheological additives) from BYK Chemie.

Additives such as porous fibers in the solid reactant component may be used to maintain the porosity of the reaction product to facilitate even distribution of the liquid reactant component and to keep the hydrogen flow paths open. Non-limiting examples of suitable porous fibers include polyvinyl alcohol (PVA) and rayon. Additives can be included to facilitate forming the solid reactant component and/or maintaining it in the desired shape for use.

In one embodiment, the solid fuel component used in the hydrogen generating apparatus includes an alkali metal silicide. The alkali metal silicide is the product of mixing an alkali metal with silicon in an inert atmosphere and heating the resulting mixture to a temperature of below about 475° C., wherein the alkali metal silicide composition does not react with dry $O_2$. Such alkali metal silicides are described in US Patent Publication 2006/0002839, which is incorporated herein by reference in its entirely. While any alkali metal, including sodium, potassium, cesium and rubidium may be used, it is preferred that the alkali metal used in the alkali metal silicide composition be either sodium or potassium. Metal silicides including a Group IIA metal (beryllium, magnesium, calcium, strontium, barium and radium) may also be suitable.

The alkali metal silicide composition reacts exothermically with water to produce hydrogen gas and sodium silicate according to the reaction:

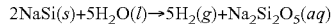

$$2NaSi(s) + 5H_2O(l) \rightarrow 5H_2(g) + Na_2Si_2O_5(aq)$$

The molar ratio of the alkali metal to silicon is about 1:1 in the alkali metal silicide. In one embodiment, the alkali metal silicide composition is $Na_4Si_4$.

In one embodiment, the solid reactant component used in the hydrogen generating apparatus includes a Group IA metal/silica gel composition. The composition has a Group IA metal absorbed into the silica gel pores. The Group IA metals include sodium, potassium, rubidium, cesium and alloys of two or more Group IA metals. The Group IA metal/silica gel composition does not react with dry $O_2$. Such Group IA metal/silica gel compositions are described in U.S. Pat. No. 7,410,567 B2, which is incorporated herein by reference in its entirely. A Group IIA metal/silica gel composition, including one or more of the Group IIA metals (beryllium, magnesium, calcium, strontium, barium and radium) may also be suitable.

The Group IA metal/silica gel composition is the product of mixing a liquid Group IA metal with silica gel under exothermic conditions sufficient to absorb the liquid Group IA metal into the silica gel pores. In one embodiment, the Group IA metal is sodium. The Group IA metal/silica gel composition reacts rapidly with water to produce gaseous hydrogen.

The amount of Group IA metal loading is dependent upon the pore size and pore density of the particular silica used. Typically, the Group IA metal may be present in the gel compositions up to about 50% by weight. Preferably, the amount of metal present ranges from about 30% to about 40% by weight.

Referring to FIG. 1, a hydrogen gas generating cartridge 10 is shown. Reaction chamber 14 is contained within housing 12. Also contained within housing 12 is bladder 16. Housing 12 may be made of any material capable of containing a gas-generating reaction and inert to the reaction components, such as stainless steel or a plastic. Non-limiting examples of a suitable material for the housing are polycarbonate, polyvinyl chloride and polypropylene. The hydrogen gas generating cartridge 10 is configured to be connected to a fuel cell (not shown) via one or more fuel ports 18 in the housing 12, such as in connector end 20.

Reaction chamber 14 is defined as the volume between the connector end 20 of the housing 12 and the liquid feed valve assembly 30.

Disposed within reaction chamber 14 is a solid reactant component 24. Solid reactant component 24 may include, for example, a chemical hydride or an alkali metal silicide as discussed above, in particulate, powder, granular, pellet, tablet or cake form for example. Fillers, binders, additives and other agents may be included in the solid reactant component 24. The solid reactant particles can be packed in a bed that incorporates empty spaces, (e.g., interstices, channels or pores) within the solid reactant component 24. These spaces allow the liquid reactant component 26 to flow through and make intimate contact with external and internal surfaces of the solid reactant component 24. The solid reactant component 24 may be replenished through a fill port 28 in connector end 20, or by otherwise opening or disassembling the housing 12. Follower 22 separates the reactant zone 75 from the remainder of the reaction chamber 14. Follower 22 functions to hold the solid reactant component 24 within a reactant zone 75 within the reaction chamber 14.

Disposed within bladder 16 is liquid reactant component 26. Preferably, liquid reactant component 26 is primarily water, and may include additives as discussed above. Bladder 16 is constructed of a deformable material that is inert to liquid reactant component 26, such as polyethylene. Bladder 16 can be configured with a plurality of corrugations, e.g., a bellows, to allow bladder 16 to collapse more easily and in a controlled manner. Bladder 16 can be made of an elastic material that will contract as liquid reactant component 26 is removed from the bladder 16. Bladder 16 is connected at one end to liquid feed valve assembly 30, which controls the flow of liquid reactant component 26 through liquid feed tube(s) 32 to reaction chamber 14. A single or multiple liquid feed tubes 32 may be used to deliver the liquid reactant component 26 to the solid reactant component 24 within the reaction chamber 14. The number and size of liquid feed tubes 32 are determined, at least in part, by the required hydrogen generation rate. Bladder 16 can be fastened at the opposite end to end cap 34 of housing 12.

Pressure is exerted on the bladder 16, by a spring 36 for example. The spring 36 can be disposed on the end of the bladder 16 and connected to liquid feed valve assembly 30. As the hydrogen generating reaction within the cartridge begins, the air within the cartridge is displaced with hydrogen.

Fuel port 18 may include a gas permeable, liquid impermeable membrane to prevent liquids or byproducts from being transferred to the fuel cell. Fuel port 18 can include one or more valves (not shown) to control the flow of hydrogen to the fuel cell and to seal the hydrogen generating apparatus when it is not in use or not connected to the fuel cell. The hydrogen generating apparatus 10 can have more than one fuel port 18, and the fuel port(s) can be located elsewhere on the housing 12.

As pressure is exerted on the bladder 16, liquid reactant component 26 is forced through the liquid feed tube(s) 32 and into the reaction chamber 14. The bladder 16 collapses as the spring 36 continues to exert pressure on the bladder 16 and forces the liquid reactant component 26 into the liquid feed tubes 32. The liquid feed valve assembly 30 and liquid feed tubes 32 move with the collapsing bladder 16 in the direction of the end cap 34. As the liquid feed valve assembly 30 moves, the reaction chamber 14 expands. When the hydrogen gas generating apparatus 10 is newly activated, the liquid feed tubes 32 extend to a distal portion of the reactant zone 75 (near the connector end 20 of the reaction chamber 14 as shown in FIG. 1). As the reaction between the liquid reactant component 26 and the solid reactant component 24 proceeds, the reaction products, which have a greater volume that the solid reactant component 24 consumed, push the follower 22 toward the bladder 16, expanding the reactant zone 75. As the liquid feed tubes 32 move with the collapsing bladder 16, the free ends of the feed tubes 32 move toward a proximal portion of the reactant zone 75 (near the follower 22 in FIG. 1) so the liquid reactant component 26 is delivered to unreacted solid reactant component 24 within the reactant zone 75 of the reaction chamber 14, leaving the spent solid reactant component 24 and reaction product toward the connector end of the reaction chamber 14. In this manner, the liquid reactant component 26 is continuously delivered close to or within the unreacted solid reactant component 24, which keeps the response time of the hydrogen generating apparatus short and reduces waste of the liquid reactant component. An additional advantage of this configuration is that the generated hydrogen gas does not pass through an area of the reactant zone 75 containing a high concentration of reaction products that can impede the flow of hydrogen. Instead, the hydrogen travels in the direction opposite the growing mass of reaction products. Until the solid reactant component bed is almost entirely expended, the bed functions as a filter for spray, so that significant additional filtering is not needed at the hydrogen fuel port 18. When the reactants are almost entirely expended, the ends of the liquid feed tubes extend just past the follower 22 into the reactant zone 75.

Follower 22 can be hydrogen permeable or include a hydrogen permeable component to allow hydrogen to pass therethrough, while retaining solid reactant component 24, liquid reactant component 26 transported from the bladder 16 and non-gaseous reaction products from the reaction of the reactants within the reactant zone 75. Follower 22 may be constructed, for example, out of a porous plastic that is sufficiently rigid so as to remain disposed against the inner wall of the housing 12 as it is pushed by the expanding reaction products along the outer surface of spring channel 44. Alternatively, follower 22 may have one or more apertures covered or filled with a hydrogen permeable filter or membrane. Hydrogen generated within the reactant zone 75 can pass through the follower and to the fuel port 18.

As the fuel supply is used, volume that was previously required for the full bladder 12 becomes available to the reaction chamber, including the expanding reactant zone 75, so that the free volume within the cartridge is kept to a minimum and the overall size and weight of the hydrogen generating cartridge 10 is reduced as much as practical.

Figure 2:
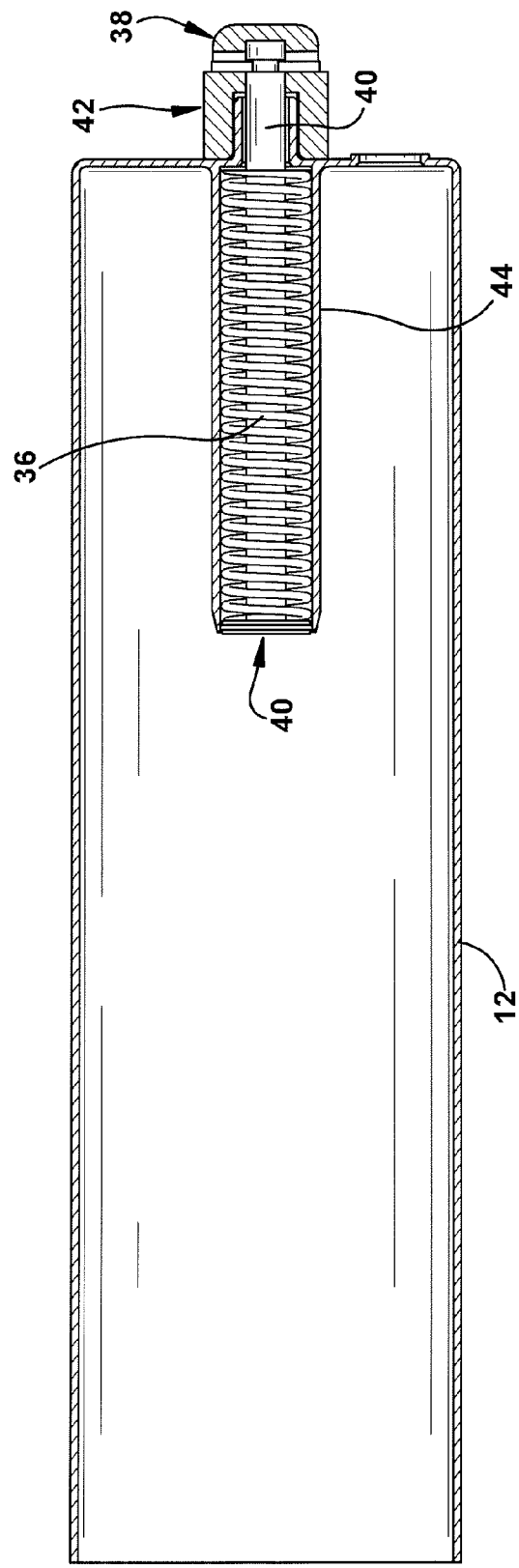
FIG. 2 is a sectional schematic view of an embodiment of the spring components prior to activation of the hydrogen generating apparatus.

As shown in FIG. 2, spring 36 can be initially constrained by a spring clip 38 attached to the spring guide rod 40. A spring guide rod 40 can hold the spring 36 in a compressed state within the spring channel 44 during storage of the hydrogen generating cartridge 10. When spring clip 38 is removed to initiate the reaction within hydrogen generating cartridge 10, the spring guide rod 40 prevents the spring 36 from buckling and failing to compress bladder 16. Clip seat 42 is removably attached to the outer surface of fuel port 18 to protect fuel port 18 from damage during storage. Upon removal of the spring clip 38 and clip seat 42, the fuel port 18 can be connected to the fuel cell to provide hydrogen gas to the fuel cell of the electronic device (not shown). When the spring clip 38 is removed, the spring 36 is released and exerts pressure on the bladder 16.

Figure 3:
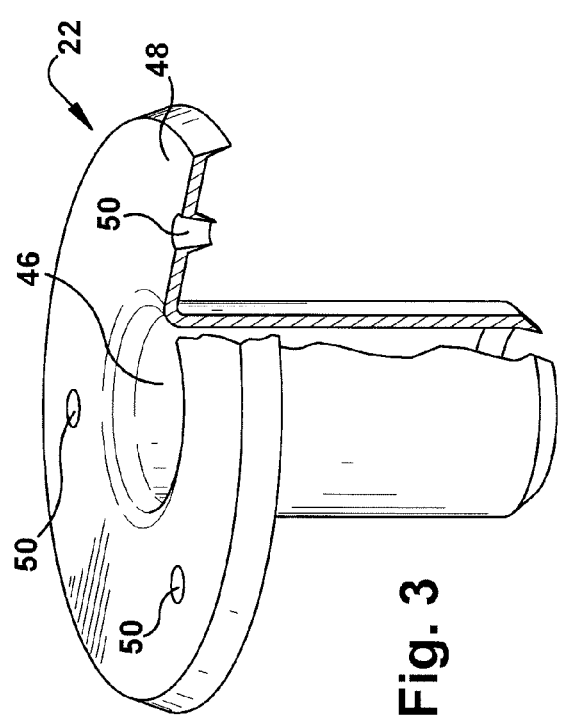
FIG. 3 is a sectional schematic view of an embodiment of the follower of the hydrogen generating apparatus according to the present invention.

As illustrated in FIG. 3, follower 22 can have a central channel 46 configured to move (e.g., by sliding) over the outer circumference of spring channel 44. In this embodiment, the annular base 48 surrounding the central channel 46 includes three feed tube bores 50 through which the liquid feed tubes 32 extend. While follower 22 of the illustrated embodiment includes three feed tube bores 50, the follower 22 may include any number of bores 50 to accommodate the number of liquid feed tubes 32 desired to deliver the liquid reactant component 26 to the solid reactant component 24. Preferably, bores 50 and liquid feed tubes 32 are relatively small in diameter so that only a small quantity of liquid reactant component 26 is delivered to solid reactant component 26 at any given point in time. Hydrogen passing through the follower 22 can flow through the spring channel 44, as shown in FIG. 3, or by another path, such as a space between a side wall of housing 12 and the outside of a sleeve around part or all of the reaction chamber 14.

Figure 4:
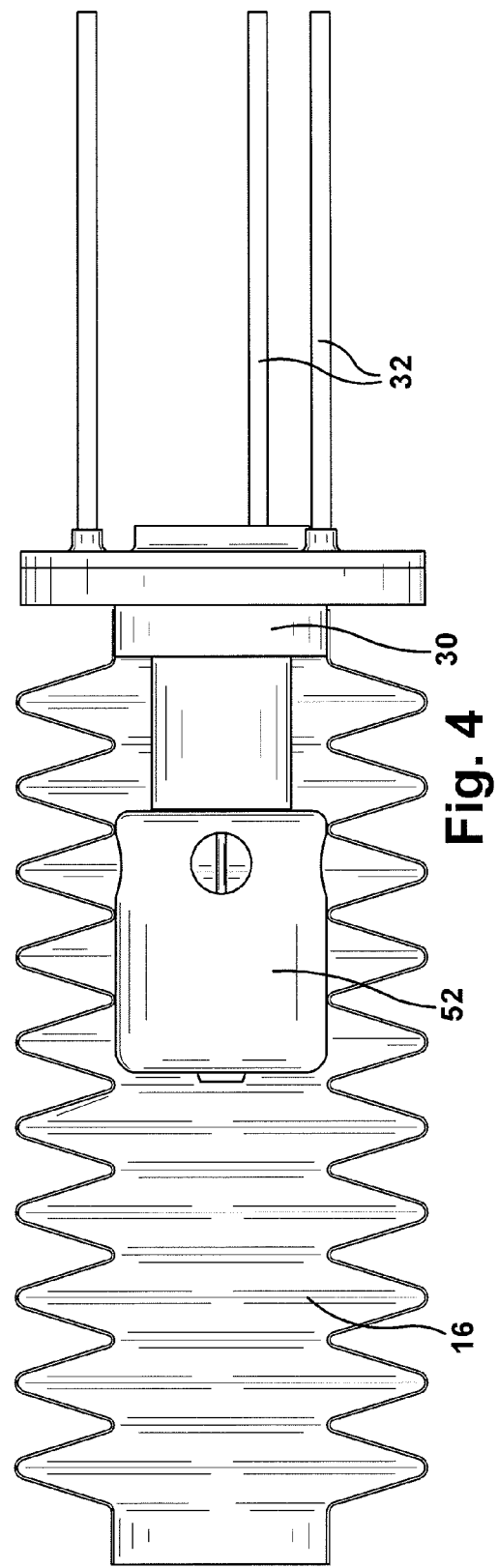
FIG. 4 is a sectional schematic view of an embodiment of the valve assembly and pressure regulator of the hydrogen generating apparatus.

Referring to FIG. 4, delivery of the liquid reactant component 26 to the reaction chamber 14 can be controlled by liquid feed valve assembly 30 and pressure regulator 52. Bladder 16 is connected to liquid valve assembly 30 and provides the source of liquid reactant component 26 delivered via liquid feed tubes 32. Pressure regulator 52 can be disposed within bladder 16 and connected to liquid valve assembly 30.

Figure 5:
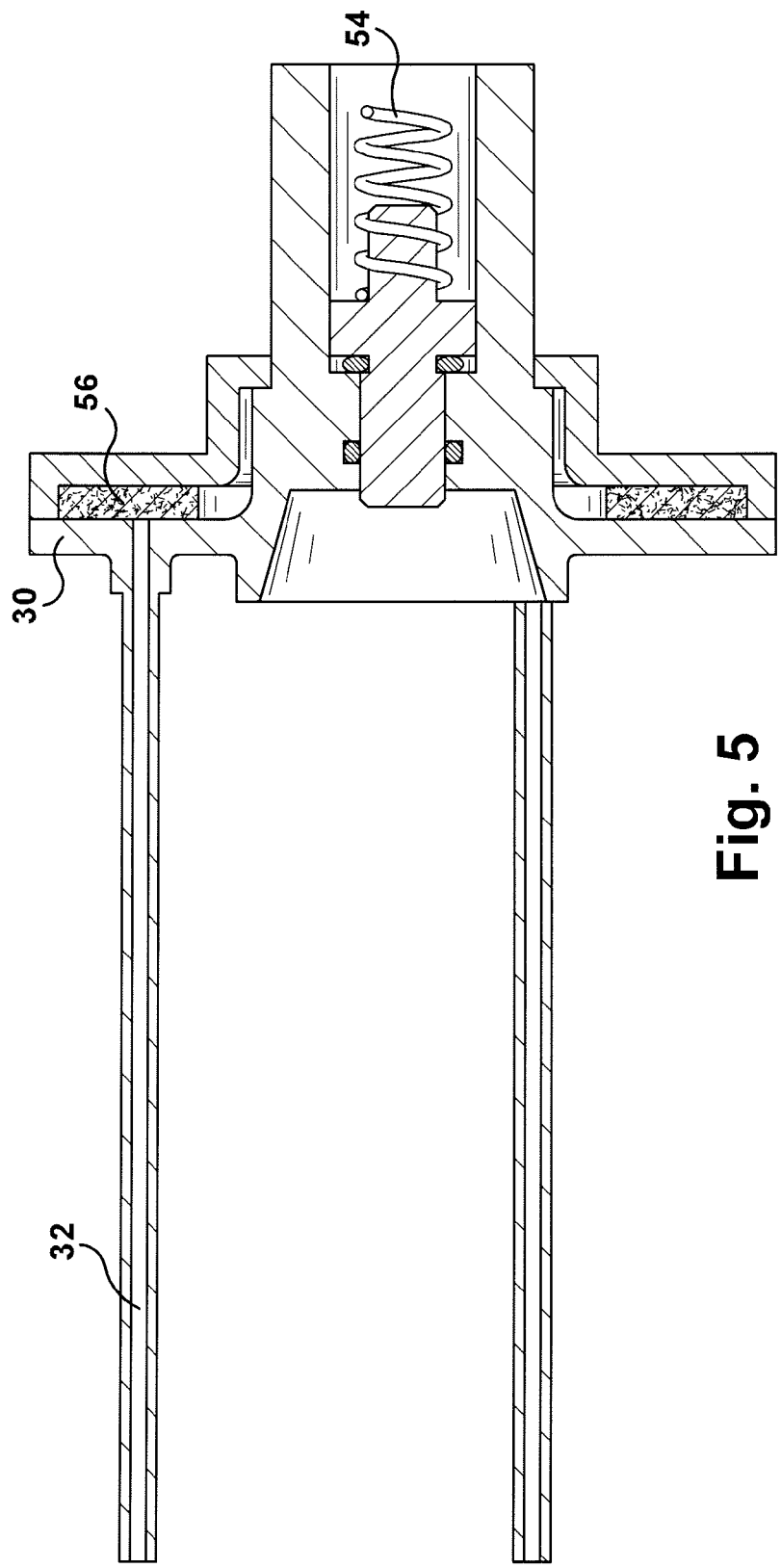
FIG. 5 is a sectional schematic view of an embodiment of the liquid valve assembly of the hydrogen generating apparatus.

Referring to FIG. 5, liquid valve assembly 30 controls the flow of liquid reactant component 26 from bladder 16. Valve spring 54 can hold the liquid valve assembly 30 closed until the hydrogen generating apparatus is activated by removal of spring clip 38. Valve assembly 30 can include felt washer 56 within the flow path to limit the flow of liquid reactant component 26 to the desired flow rate and prevent an excess of liquid reactant component 26 from being delivered to the reaction chamber 14.

Figure 6:
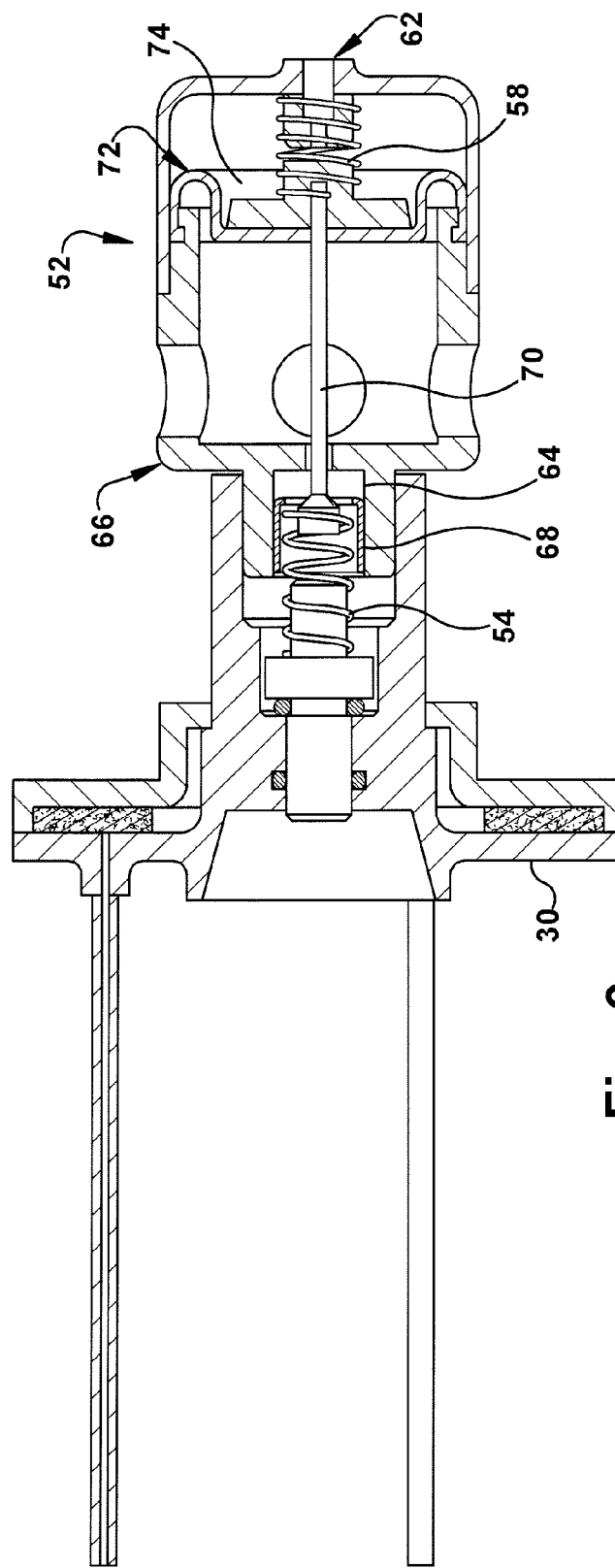
FIG. 6 is a sectional schematic view of an embodiment of the pressure regulator of the hydrogen generating apparatus.

Referring to FIG. 6, pressure regulator 52 can shut down the flow of liquid reactant component 26 when the pressure within the hydrogen generating cartridge rises above a threshold value. As the liquid reactant component 26 within the bladder 16 is used, spring 36 exerts less force so that the gas pressure within the bladder 16 will rise to keep the total pressure within the housing essentially constant. The total pressure is balanced by regulator spring 58 and by the vent tube 60 that extends from vent tube port 62 to end cap 34. The pressure exerted by regulator spring 58 is relatively low. In one embodiment, this pressure is about 1.5 psi when the cartridge is new, and about 0.5 psi when the cartridge is almost depleted. Preferably, the hydrogen generating cartridge 10 will operate at a pressure of about 2 to 3 atmospheres over ambient pressure.

The pressure regulator 52 may be secured to the liquid feed valve assembly 30, for example, by an ultrasonic weld or a laser weld. Valve spring 54 functions to hold the liquid feed valve assembly 30 closed and to hold the regulator valve seat 64 against the end of the regulator body 66. Regulator valve seat retainer 68 functions to maintain the concentric alignment of the moving components and to prevent the valve spring 54 from locally deforming regulator valve seat 64. Regulator valve stem 70 includes a threaded end that screws into regulator diaphragm 72. Regulator diaphragm 72 may be constructed of an elastomer, such as Hypalon®, which can be insert molded onto interior disk 74, which is made of a harder material. Regulator spring 58 exerts pressure on interior diaphragm disk 74 and determines the operating pressure of the hydrogen generating cartridge 10.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed:

1. A hydrogen gas generating apparatus comprising:
a housing having a fixed interior volume;
an expandable reaction chamber within the housing comprising a moveable partition defining an expandable reactant zone and containing a solid reactant component within the reactant zone;
a collapsible receptacle within the housing containing a liquid reactant component;
a fluid path for transporting the liquid reactant component from the collapsible receptacle to the reactant zone of the reaction chamber; and
a liquid reactant transport control system;
wherein:
the liquid reactant component reacts with the solid reactant component within the reaction chamber to generate hydrogen gas;
the fluid path is coupled to the moveable partition or an intermediate component between the collapsible receptacle and the reaction chamber, so that when the partition or the intermediate component moves, the fluid path outlet moves within the reaction zone from a distal portion toward a proximal portion of the reactant zone relative to the moveable partition; and
the reaction chamber is in a volume exchanging relationship with the collapsible receptacle such that the reaction chamber is able to expand into a volume previously occupied by the liquid reactant component in the collapsible receptacle.

2. The apparatus of claim 1, wherein the fluid path comprises a plurality of tubular members attached to the collapsible receptacle, each member having a free end extending into the reactant zone of the reaction chamber.

3. The apparatus of claim 2, wherein the free ends of the tubular members are movable with the collapsible receptacle to transport liquid reactant component to unreacted solid reactant component within the reactant zone.

4. The apparatus of claim 1, wherein the liquid reactant control system comprises a valve.

5. The apparatus of claim 4, wherein the liquid reactant control system further comprises a pressure regulator attached to the valve.

6. The apparatus of claim 5, wherein pressure regulator is positioned within the collapsible receptacle.

7. The apparatus of claim 1, wherein the moveable partition comprises a porous material.

8. The apparatus of claim 1, wherein the solid reactant component comprises a chemical hydride and the liquid reactant component comprises water.

9. The apparatus of claim 8, wherein the chemical hydride comprises sodium borohydride.

10. The apparatus of claim 1, wherein the solid reactant component comprises sodium silicide and the liquid reactant component comprises water.

11. The apparatus of claim 1, wherein the moveable partition is a slidable partition that slides within the reaction chamber.

* * * * *